United States Patent [19]

Kobayashi

[11] Patent Number: 5,153,737
[45] Date of Patent: Oct. 6, 1992

[54] IMAGE FORMING APPARATUS WITH AN EDITING FUNCTION

[75] Inventor: Junichi Kobayashi, Saitama, Japan

[73] Assignee: Fuji Electronic Co., Ltd., Tokyo, Japan

[21] Appl. No.: 748,818

[22] Filed: Aug. 22, 1991

[30] Foreign Application Priority Data

Aug. 23, 1990 [JP] Japan .................. 2-221914

[51] Int. Cl.⁵ .............. H04N 1/23; H04N 1/38; H04N 1/387
[52] U.S. Cl. .................. 358/296; 358/450; 358/452; 358/453
[58] Field of Search ............... 358/296, 450, 452, 453, 358/488

[56] References Cited

U.S. PATENT DOCUMENTS

| | | | |
|---|---|---|---|
| 4,270,146 | 5/1981 | Adachi | 358/453 |
| 4,471,386 | 9/1984 | Tuhro | 358/453 |
| 4,837,635 | 6/1989 | Santos | 358/453 |
| 4,933,778 | 6/1990 | Tufano | 358/488 |
| 5,033,102 | 7/1991 | Nakajima | 358/453 |

Primary Examiner—Joseph W. Hartary
Assistant Examiner—Scott A. Rogers
Attorney, Agent, or Firm—Finnegan, Henderson, Farabow, Garrett and Dunner

[57] ABSTRACT

An image forming apparatus with an editing function for making up documents for respective distribution destinations from an original document on which the distribution destinations are indicated by closed areas with markers. The image forming apparatus comprises a marker detection portion for detecting position information of the markers at the time of pre-scanning, a marker position storage portion for storing the position information of the markers, a marker removal portion for removing the markers from original document information at the time of main-scanning, and a marker processing and combining portion for making up processed information on the basis of the marker position information stored in the marker position storage portion every time when the main-scanning is performed, and for combining the processed information with the marker-removed original document information.

4 Claims, 9 Drawing Sheets

FIG. 4
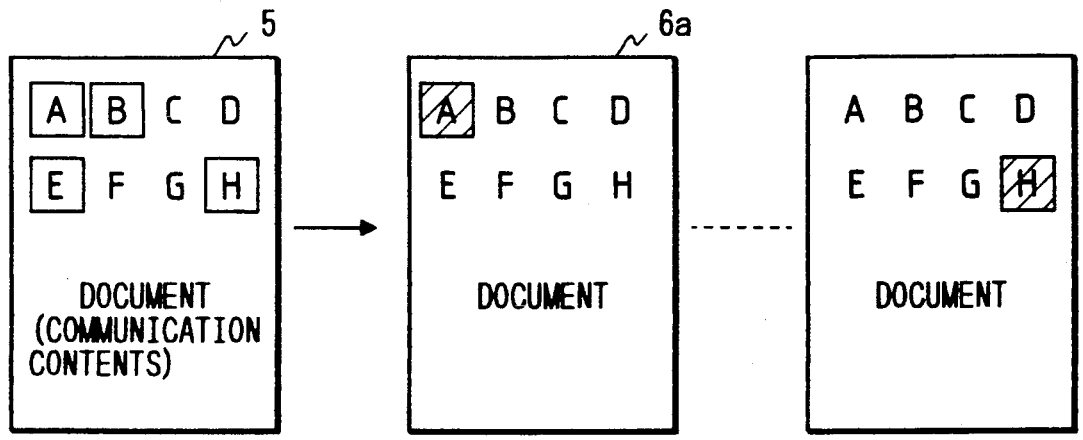
FIG. 5(a)
| | LEFT UPPER CORNER X | LEFT UPPER CORNER Y | RIGHT LOWER CORNER X | RIGHT LOWER CORNER Y |
|---|---|---|---|---|
| 1 | | | | |
| 2 | | | | |
| 3 | | | | |
FIG. 5(b)
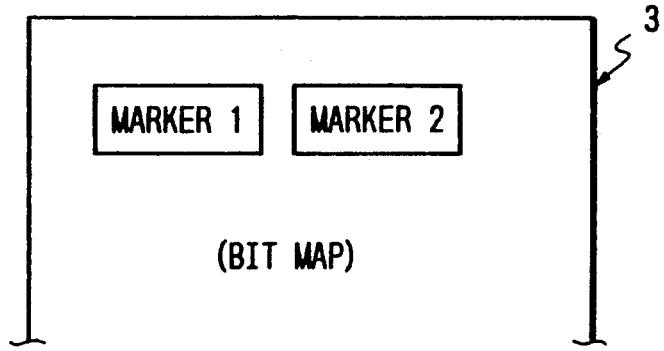

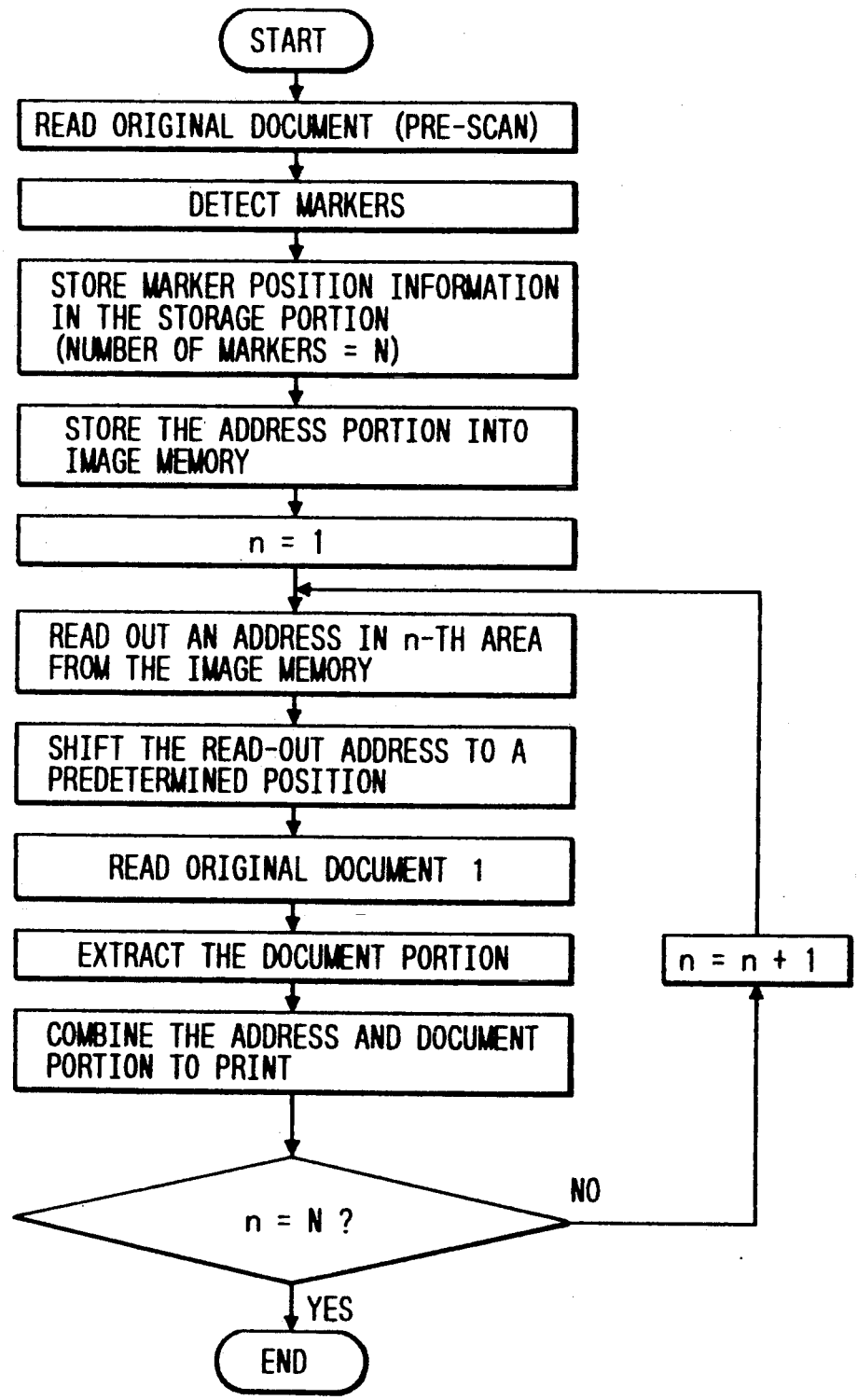

IMAGE FORMING APPARATUS WITH AN EDITING FUNCTION

BACKGROUND OF THE INVENTION

1. Field of the Invention

The present invention relates to an image forming apparatus with an editing function, and particularly to an image forming apparatus with an editing function for recognizing a marker added to an address column of an original document and for automatically copying the original document having the marked address as a distribution destination, or for automatically extracting and copying only a portion indicated with a marker in the original document.

2. Description of the Related Art

Conventionally, when communication documents are to be sent to a plurality of distribution destinations, a required number of copies of an original document are prepared by a copying machine and then the distribution destinations are written with a pen or the like on the copies one after one, or if the distribution destinations have been written on the original document in advance, a selected one of the distribution destinations on the copied communication documents is marked with a marker pen or the like on each of the copies one by one.

It is often desired to extract and enlarge information at a plurality of portions in a sheet of an original document. Conventionally those plurality of portions are cut out from the original document or from a copy thereof, and the cut-out portions are placed on a platen of a copying machine one by one manually to be copied in enlarged or reduce form.

Since distribution destinations conventionally are written on copied communication documents one by one manually, it has been troublesome to make up the communication documents. In addition, two identical communication documents sometimes are erroneously sent to the same distribution destination at the same time.

In addition, when information extracted from a plurality of portions in an original document is to be copied and enlarged, the work conventionally has been performed manually.

SUMMARY OF THE INVENTION

It is therefore an object of the present invention to solve the foregoing problems in the prior art.

It is another object of the present invention to provide an image forming apparatus with an editing function in which communication documents having respectively assigned distribution destinations can be made up one by one automatically if the distribution destinations are marked on an original document with a marker pen or the like in advance.

It is a further another object of the present invention to provide an image forming apparatus with an editing function in which if desired areas are marked on an original-document with a marker pen or the like in advance, only the marked areas can be copied in an enlarged manner automatically.

The foregoing objects of the present invention are attained by an image forming apparatus with an editing function for making up documents for respective distribution destinations from an original document on which the distribution destinations are indicated by closed areas with markers, the image forming apparatus comprising a marker detection portion for detecting position information of the markers at the time of pre-scanning, a marker position storage portion for stiring the position information of the markers, a marker removal portion for removing the markers from original document information at the time of main-scanning, and a marker processing and combining portion for making up processed information on the basis of the marker position information stored in the marker position storage portion every time when the main-scanning is performed, and for combining the processed information with the marker-removed original document information.

According to the present invention, if distribution destinations for an original document are enclosed by a number of markers and the image forming apparatus is started, position data of all the markers are stored at a time of pre-scanning. At a time of main-scanning, all the markers are removed from the original document information, and marker information processed at a position corresponding to one of the position data is combined with the original document information, and printed out. The main-scanning is repeated by the number of times corresponding to the number of the marked distribution destinations.

As a result, copied documents respectively having different distribution destinations can be obtained so that it is unnecessary to write the distribution destinations on copied documents one by one manually.

BRIEF DESCRIPTION OF THE DRAWINGS

Other features and advantages of the present invention will be apparent from the following description taken in connection with the accompanying drawings, wherein:

FIG. 4 is a diagram illustrating an example of an original document and documents to be printed out;

FIGS. 5a and 5b are conceptual diagrams illustrating marker position data stored in a marker position storage portion;

FIG. 9 is a flow chart showing the operation of a modification of the second embodiment;

DETAILED DESCRIPTION OF THE PREFERRED EMBODIMENTS

The present invention will be described in detail with reference to the drawings.

Figure 2:
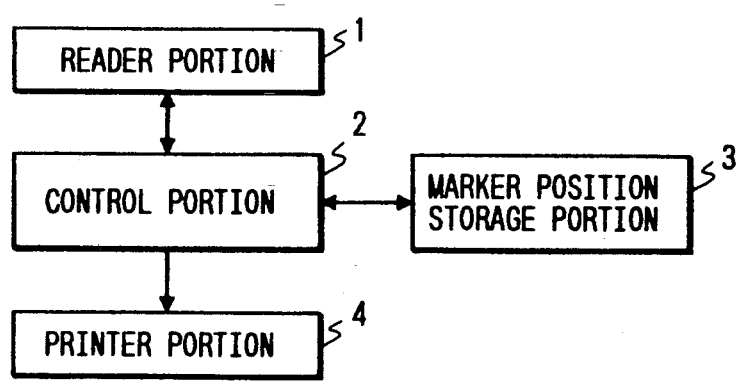
FIG. 2 is a block diagram illustrating a schematic hardware arrangement of the embodiment.

FIG. 2 shows a schematic hardware configuration of an image forming apparatus with an editing function according to the present invention. In FIG. 2, the reference numeral 1 a reader portion of the image forming apparatus, reference numeral 2 represents a control portion (CPU) for performing processing such as detecting markers from the contents read by the reader portion 1, removing the markers, adding processed marker data to original document information, etc., reference numeral 3 represents a marker position storage portion for storing the positions of the markers detected by the control portion 2, and reference numeral 4 represents a printer portion.

Figure 1:
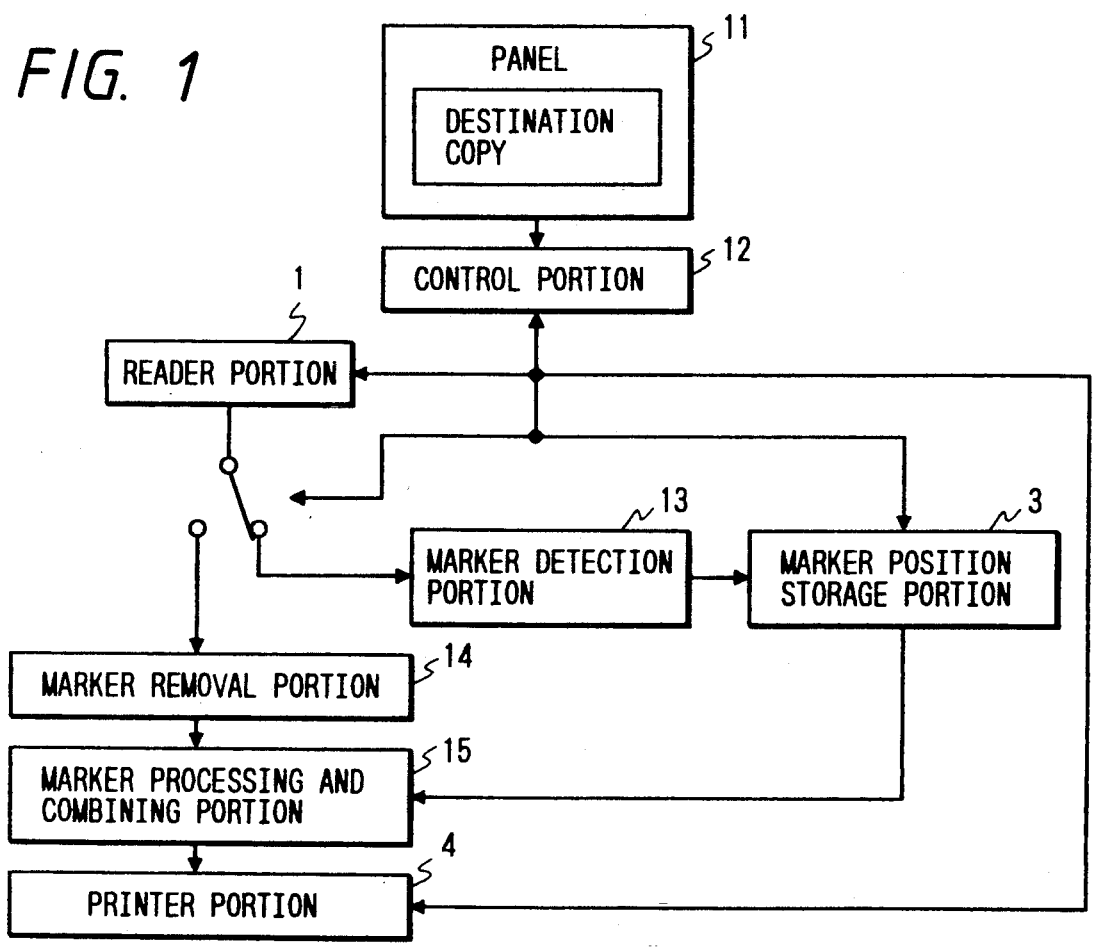
FIG. 1 is a functional block diagram illustrating an embodiment of the present invention.

FIG. 1 is a functional block diagram illustrating this embodiment. In the Figures, identical reference numerals are used for the same or equivalent parts. The reference numeral 11 represents a panel of a copying machine which is the image forming apparatus, reference numeral 12 represents a control portion, reference numeral 13 represents a marker detection portion, 14 represents a marker removal portion, and reference numeral 15 represents a marker processing and combining portion.

Figure 3:
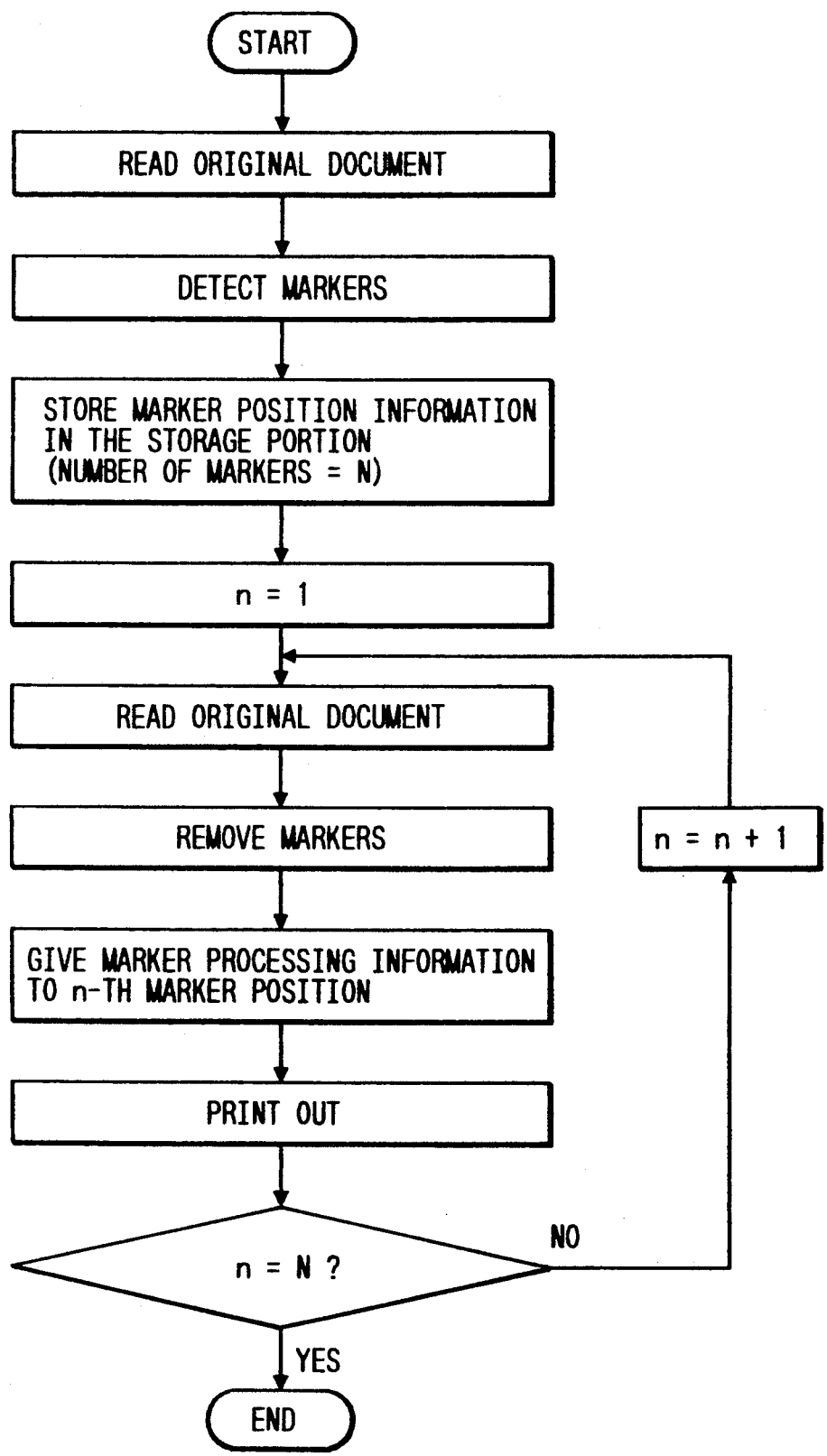
FIG. 3 is a flow chart showing the operation of the embodiment.

Next, the operation of this embodiment will be described with reference to FIGS. 1 and 3. FIG. 3 is a flow chart explaining the operation of this embodiment.

First, for example, if a destination copy key provided on the panel 11 is operated, the control portion 12 sends a start signal to the reader portion 1 to make the reader portion 1 operate. Here, it is assumed that an original document put on the reader portion 1 has addresses A to H and communication contents, and that the addresses A, B, E and H are assigned as distribution destinations by using markers, as shown by an original document 5 in FIG. 4.

Original document information read through the reader portion 1 is first sent to the marker detection portion 13 which detects the markers affixed to the distribution destinations A, B, E and H. detected. Since the markers written with a marker pen have half-tone density, the detection of the markers may be performed by detecting half-tone density in the original document information. Marker position information detected by the marker detection portion 13 is sent to and stored in the marker position storage portion 3. The marker position storage portion 3 may store the marker position information in the form of X and Y coordinates of the upper let and lower right corners of the markers as shown in the conceptual diagram of FIG. 5a, or in the form of a bit map as shown in FIG. 5b. After the markers are detected the control portion 12 recognizes the number (=N) of the markers, thereby recognizing the number of copies.

Next, the control portion 12 actuates the reader portion 1 to read the original document for a first copy (n=1). Original document information read through the reader portion 1 is sent to the marker removal portion 14 by which the markers are removed from the information. After that, the original document information is sent to the marker processing and combining portion 15.

The marker processing and combining portion 15 performs a process such as meshing on a marker position which is sent one by one from the marker position storage portion 3, and combines this meshed information with the original document information. The marker processing and combining portion 15 is not limited to the performing process of meshing, but may perform a process such as coloring, bold typing, negative/positive reversing, etc.

The original document information having the meshed information at its marker position is sent to the printer portion 4 so as to be printed out. For example, as shown by a document 6a in FIG. 4, a copy having a meshed portion at the distribution destination A is outputted.

Upon the completion of the first copy in the above-mentioned manner, the control portion 12 determines, from the number of markers, whether it is necessary to make an additional copy or not and, if necessary, the control portion 12; sends a start instruction to the reader portion 1 again. The reader portion 1 reads the original document for a second copy, and after the markers are removed from the read original document information by the marker removal portion 14, the read original document information is sent to the marker processing and combining portion 15. Since the marker processing and combining portion 15 is supplied with the second marker position data, the marker processing and combining portion 15 performs meshing on the second marker position, and the original document information including meshed information is sent to the printer portion 4.

In the above-mentioned manner, copying is repeated by the number of times corresponding to the number of markers affixed to the original document 5 (four in this embodiment), so that each copy has a different meshed distribution destination. It is therefore possible to enter a distribution procedure without adding anything to copied communication documents. In addition, there is no problem of making a communication document having a wrong distribution destination.

Although the above embodiment has no page memory to store original document information read through the reader portion 1, the present invention can be applied to an apparatus having a page memory.

Figure 6:
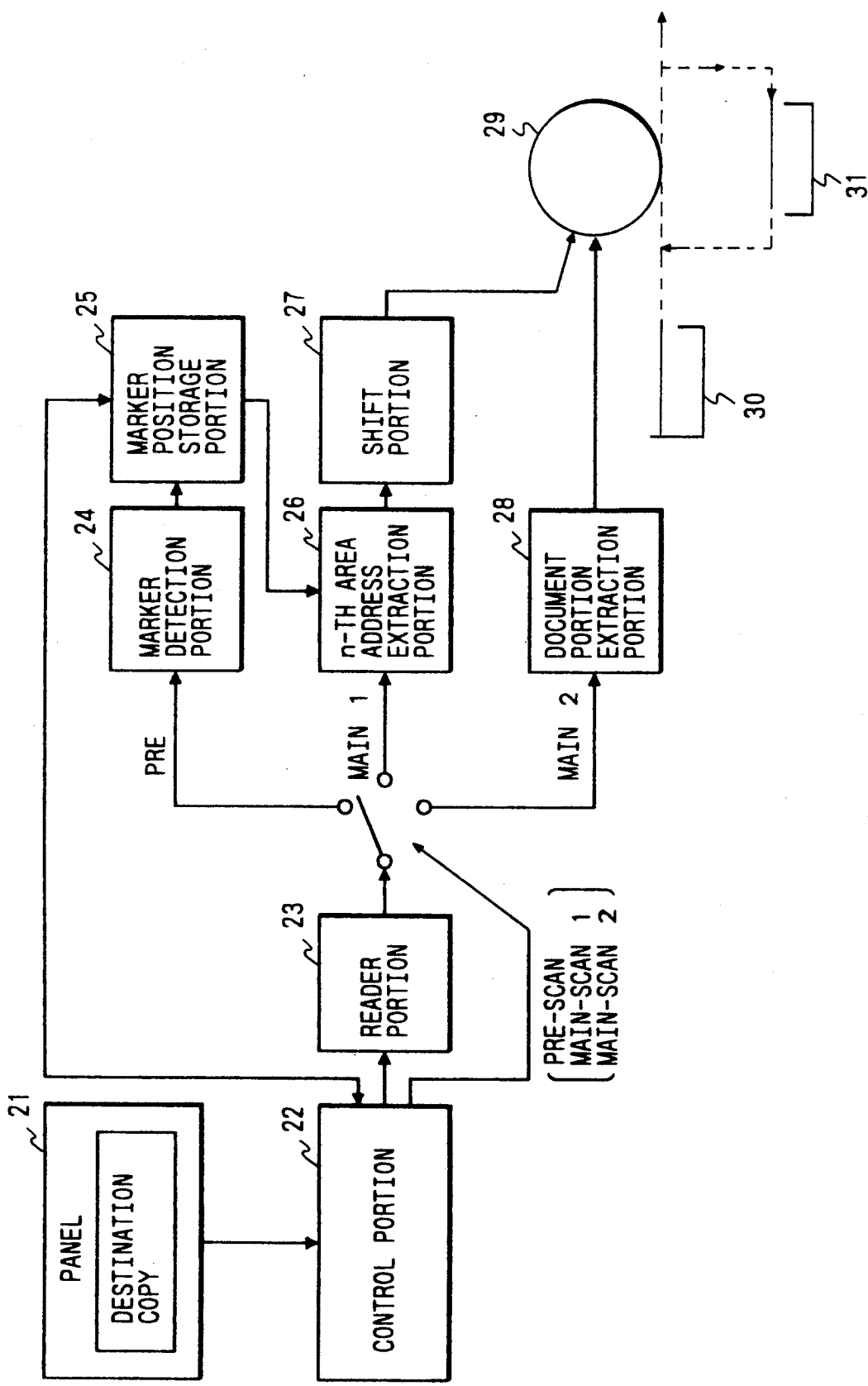
FIG. 6 is a functional block diagram illustrating a second embodiment of the present invention; lo
Figure 7:
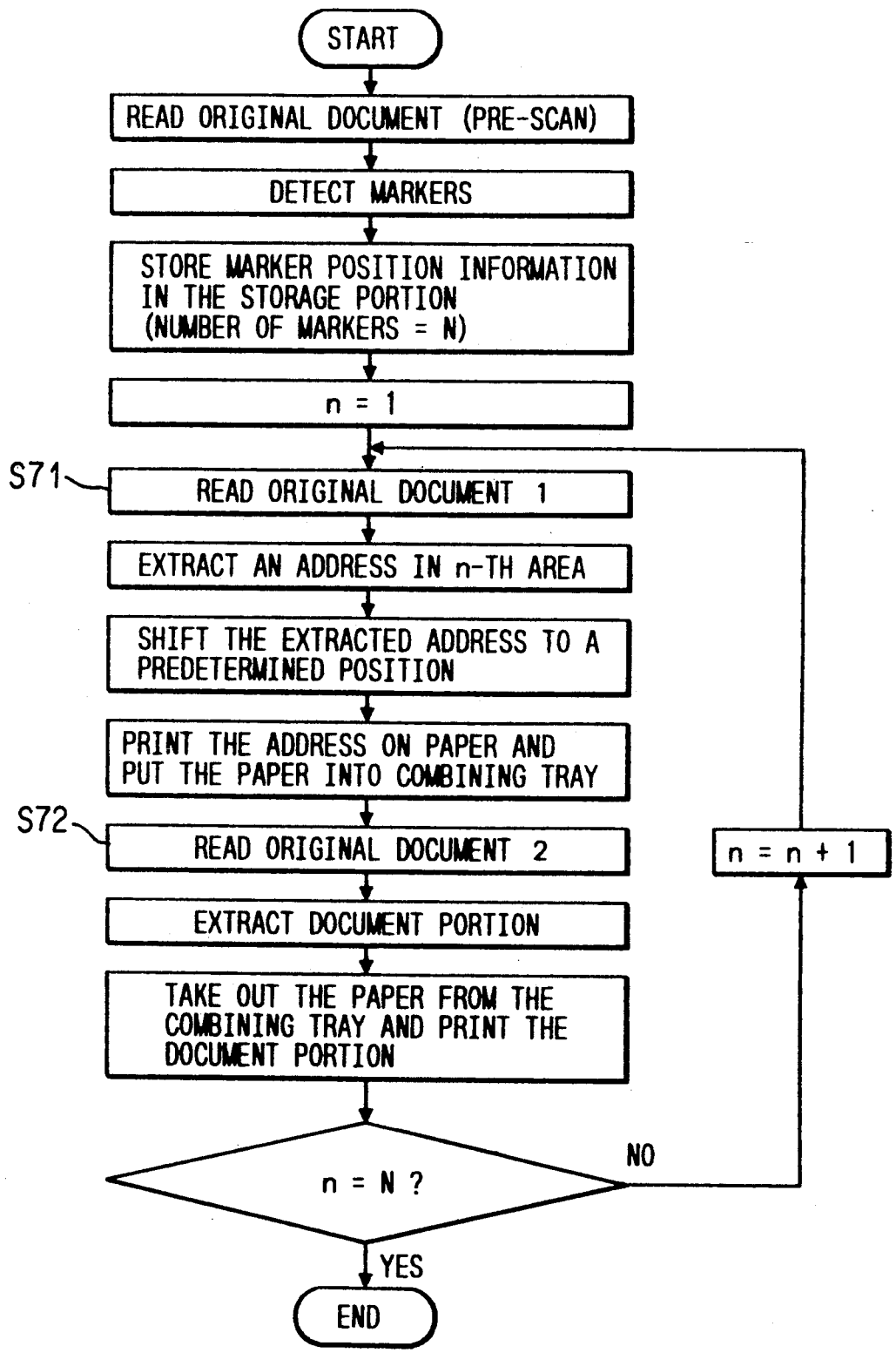
FIG. 7 is a flow chart showing the operation of the second embodiment.

Next, a second embodiment of the present invention will be described with reference to FIGS. 6 and 7. FIG. 6 is a functional block diagram illustrating the second embodiment, and FIG. 7 is a flow chart showing the operation thereof.

For example, if a destination copy key on a panel 21 is pressed, a control portion 22 actuates a reader portion 23 to pre-scan an original document which is set thereon.

Figure 8:
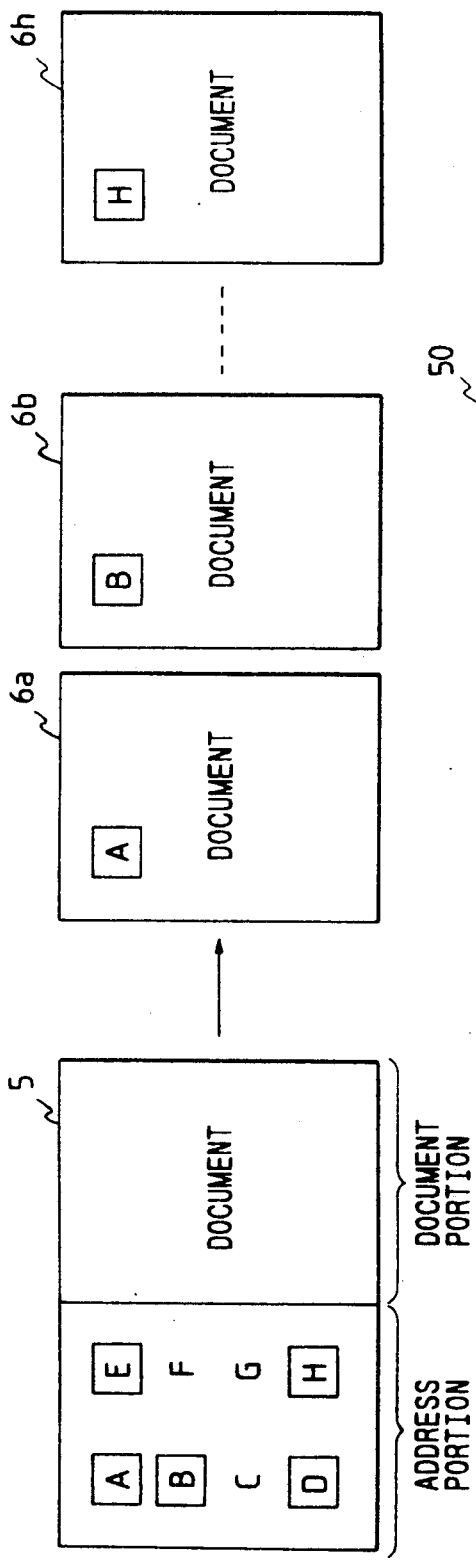
FIG. 8 is a diagram illustrating an example of an original document and documents to be printed out.

FIG. 8 shows an example of an original document used in this embodiment. An original document 5 has an address portion and a document portion. Distribution destinations in the address portion are marked with half-tone density, for example, by means of a marker pen or the like. In FIG. 8, distribution destinations A, B, D, E and H are marked.

When the above-mentioned pre-scanning is performed, a marker detection portion 24 detects markers, and a marker position storage portion 25 stores marker position information.

Upon the completion of the pre-scanning, the control portion 22 executes an instruction of first main-scanning (step S71). When an original document is read out through the reader portion 23, the read original document information is sent to an nth-area address extraction portion 26, in which an address in an nth-area is extracted from the information. Position information of the nth-area is sent from the marker position storage portion 25 to the address extraction portion 26. The extracted address is sent to a shift portion 27, and shifted to a predetermined position.

In the case of FIG. 8, first, the address A is extracted by the nth-area address extraction portion 26, and shifted to an address print position on a document 6a. Then the address A extracted by the nth-area address extraction portion 26 may be combined with a processed marker and sent to the shift portion 27. The processing may be performed by coloring, bold typing, negative/positive reversing, etc. in the same manner as in the first embodiment.

The above-mentioned address is sent from the shift portion 27, for example, onto a photoreceptor 29 of a laser printer. A latent image formed on the photoreceptor 29 is developed by a development means (not shown), and transferred onto a paper 30 fed from a paper feed tray. Then, the paper 30 is temporarily put into a combining tray 31.

Next, the control portion 22 executes an instruction of second main-scanning (step S72). When the original document is read out through the reader portion 23, the read original document information is supplied to a document portion extraction portion 28. The document portion extraction portion 28 extracts only the document portion from the original document 5, and sends it to the photoreceptor 29 of the above-mentioned laser printer. The paper 30 in the combining tray 31 is taken out, and the developed document portion on the photoreceptor 29 is transferred to the paper 30. Next, the paper 30 is fused by a fusing means (not shown), and issued.

The above steps regarding the main-scanning (steps S71 and S72) and are repeated a number of times corresponding to the number of marked addresses (five times in the described embodiment).

Upon the completion of the above sequential steps, as shown in FIG. 8, copies 6a, 6b, . . . , 6h each having a distribution destination printed on the left upper portion of the paper. According to the present embodiment, it is therefore possible to easily obtain communication documents having distribution destinations with no error.

Although the above embodiment has no image memory, FIG. 9 shows a flow chart for an embodiment of the present invention having an image memory. In a system having an image memory, since the address portion can be stored in the image memory at the time of pre-scanning, it is possible to read out addresses from the image memory. It is therefore possible to reduce the number of times the main-scanning is performed to one, instead of two as in the above embodiment.

Next, a third embodiment of the present invention will be described.

Figure 11:
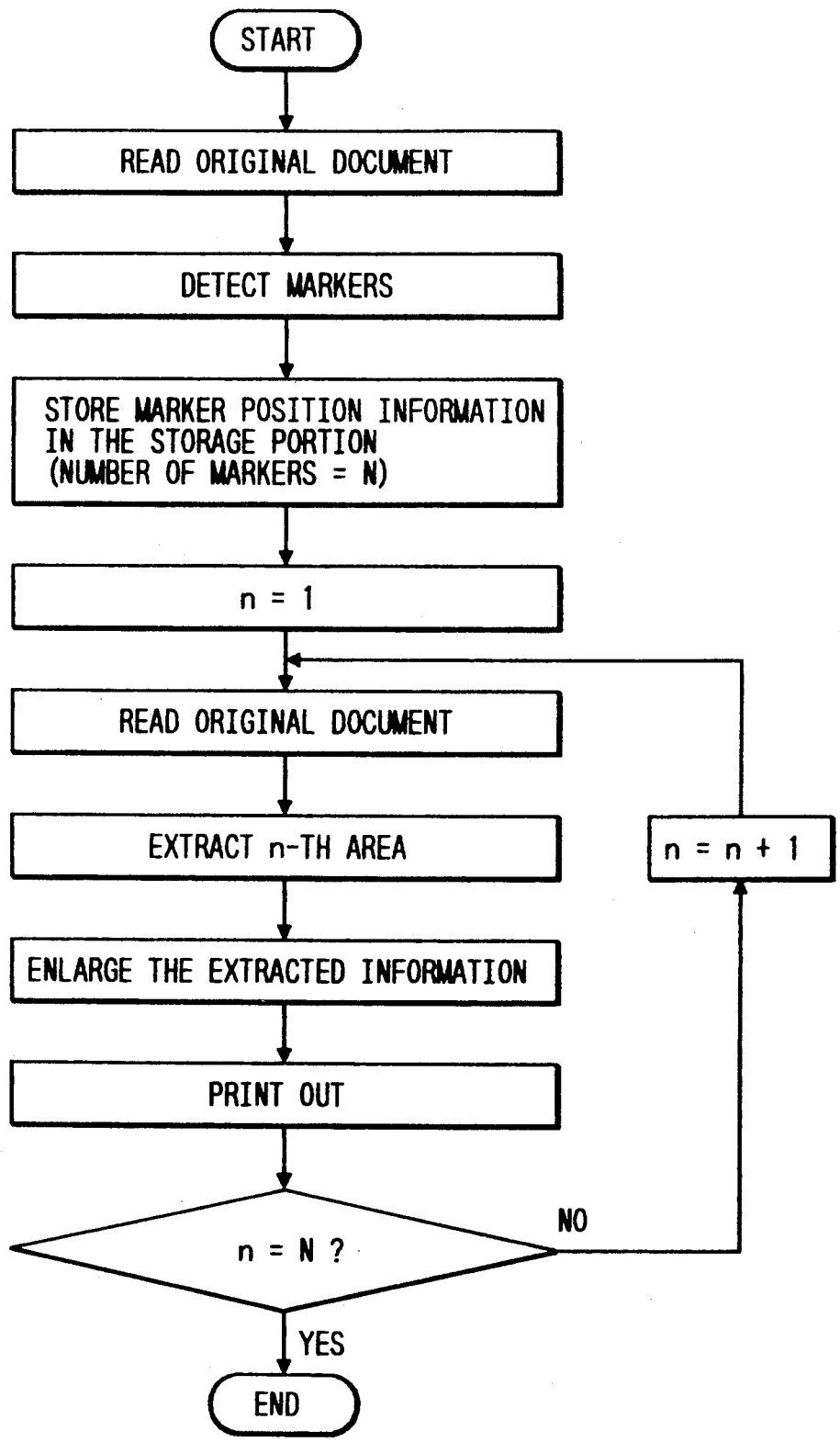
FIG. 11 is a flow chart showing the operation of the third embodiment.
Figure 10:
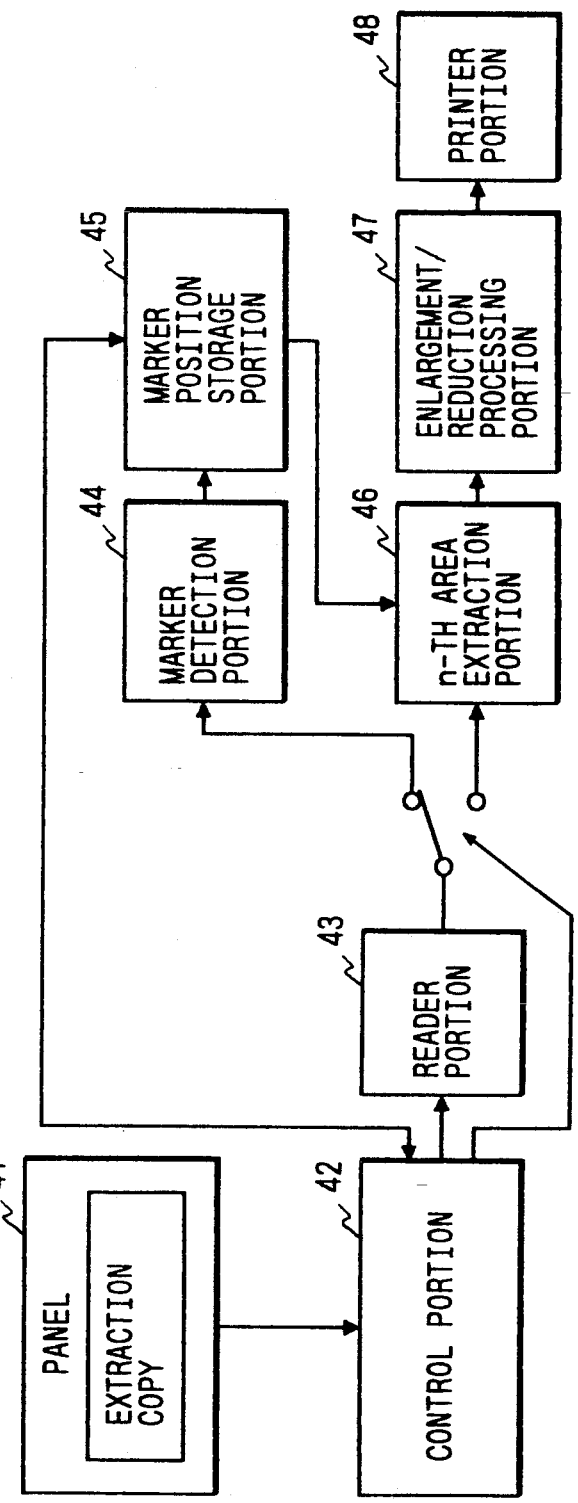
FIG. 10 is a functional block diagram illustrating a third embodiment of the present invention.

In FIG. 10 is a functional block diagram illustrating the third embodiment, and FIG. 11 is a flow chart showing the operation of this embodiment.

In FIG. 10, for example, when an extraction copy key on a panel 41 is pressed, a control portion 42 actuates a reader portion 43 to read out an original document which is set thereon.

Figure 12:
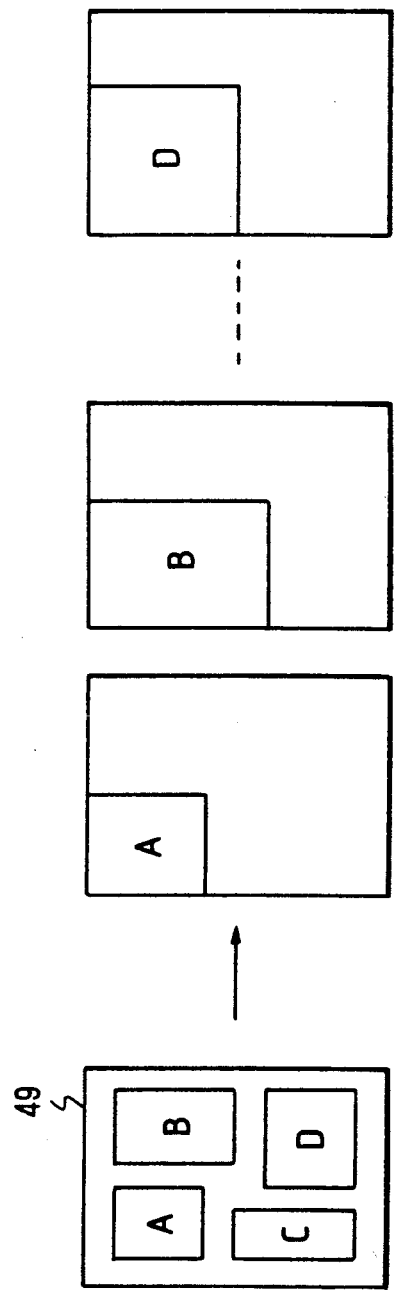
FIG. 12 is a diagram illustrating an example of an original document and documents to be printed out.

FIG. 12 shows an example of this original-document. In an original document 49, as illustrated, areas to be copied and enlarged are enclosed with a marker pen or the like at predetermined portions on the original document 49. In the illustrated example, areas of original document information A to D are enclosed.

When the original document is read out through the reader portion 43, the read original document information is sent to a marker detection portion 44 by which marker positions are detected. Detected marker position information is sent to a marker position storage portion 45 to be stored.

Upon storage of the marker position information, the control portion 42 an instruction to the reader portion 43 to read out the original document another time. Read original document information is sent to an nth-area extraction portion 46 which extracts information corresponding to a marker position sent from the maker position storage portion 45. The extracted information is enlarged by an enlargement/reduction processing portion 47, and sent to a printer portion 48.

Upon the completion of copying a first extracted area, the original document is read out again, and original document information in a second area is extracted and enlarged in the same manner, and sent to the printer portion 48.

The above operation is repeated by the number of times (four times in this embodiment) corresponding to the number of marked areas, and upon the completion of the whole processing, it is possible to obtain copies in which marked areas are enlarged on different sheets respectively, for example, as shown in FIG. 12.

The enlargement/reduction processing portion 47 may decide a scale factor automatically. In addition, means for shifting original document information processed by the enlargement/reduction processing portion 47 to the center of paper may be provided, or means for selecting a paper suitable to the processed original document information automatically may be provided.

Figure 13:
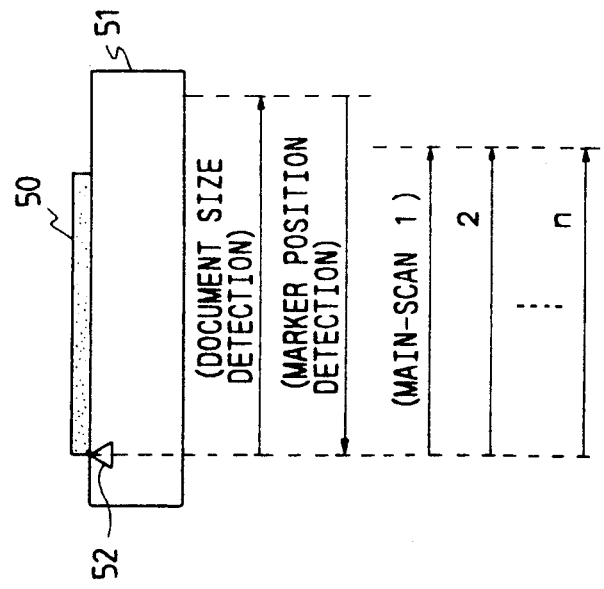
FIG. 13 is a diagram for explaining an example of the operation of the carriage in the copying machine.

Although both reading markers and reading original document information are performed at the time of the going operation of a carriage in the above-mentioned respective embodiments, it is not always necessary to read the markers at the time of the going operation of the carriage., Instead, the markers may be read at the time of the returning operation of the carriage FIG. 13 shows a carriage 52 of an optical unit in a reading apparatus 51 on which an original document 50 is mounted. As shown in FIG. 13, at the time of the going operation of carriage 52, the document size is detected and a paper having a suitable size is fed from a paper feed tray (not shown). Then, at the time of the returning operation of the carriage 52, marker positions added onto the original document 50 are detected. Data of the marker positions are stored in the above-mentioned marker position storage portion 3, 25, 40, or the like.

Next, the first main-scanning operation is performed to read original document information. After that, the main-scanning operation is repeated by a required number of times, processing is performed as described in the above embodiments upon marked addresses, original document information, etc.

Consequently, because pre-scanning is performed only one time, it is possible to shorten the time required for copying.

As has been described, according to the present invention, if addresses are indicated with a marker pen or the like on an original document in advance, communication documents on which addresses or distribution destinations are indicated can be automatically obtained by copying, and it becomes unnecessary to write addresses by hand after making a required number of copies. Thus, the present invention saves troublesome work when making up communication documents.

In addition, since there is no possibility that the addresses written on the communication documents are overlapped or mistaken a number of documents can be distributed accurately.

In addition, if areas to be extracted and enlarged are indicated with a marker pen or the like on an original document in advance, it is possible to automatically obtain copies in which only respective indicated areas are enlarged, and it is therefore unnecessary to cut the areas from the original document, enlarge and copy them one by. Thus, the present invention makes it possible to perform extraction and enlargement easily.

What is claimed is:

1. An image forming apparatus with an editing function for making up documents for respective distribution destinations from an original document on which the distribution destinations are indicated by closed ares with markers, said paper image forming apparatus comprising:

marker detection means for detecting position information of said markers t a time of pre-scanning of the original document;

marker position storage means for storing said position information of said markers;

marker removal means for removing said markers from original document information at a time of main-scanning; and marker processing and combining means for making up processed information on the basis of said marker position information stored in said marker position storage means when said main-scanning is performed, and for combining said processed information with said marker-removed original document information.

2. An image forming apparatus with an editing function for making up documents for respective distribution destinations from an original document separately having an address portion and a document portion in which document information is described, said distribution destinations being indicated by closed areas with markers on said address portion, said image forming apparatus comprising:

marker detection means for detecting position information of said markers at the time of pre-scanning;

marker position storage means for storing said position information of said markers; and copying means for extracting one of said distribution destinations from said address portion o the basis of data from said marker position storage means at the time of main-scanning, and for copying said extracted distribution destination and information of said document portion at predetermined positions on a copying paper, said main-scanning being repeated by a number of times corresponding to the number of said distribution destinations.

3. An image forming apparatus with an editing function for extracting and copying original document information from desired areas enclosed by markers on an original document, said image forming apparatus comprising:

marker detection means for detecting position information of said marker at the time of pre-scanning;

marker position storage means for storing said position information of said markers;

area extracting means for extracting original document information from one of said enclosed areas on the basis of data from said marker position storage means; and a processing portion from enlarging or reducing said original document information extracted by said area extracting means.

4. An image forming apparatus according to claim 1, wherein said processed information includes a plurality of different processed information, and wherein the marker processing and combining means further includes mean for combining said plurality of different processed information with said marker-removed original document information to create a plurality of copied documents, each copied document having one of said plurality of different processed information added thereto.

* * * * *

UNITED STATES PATENT AND TRADEMARK OFFICE
CERTIFICATE OF CORRECTION

PATENT NO. : 5,153,737
DATED : October 06, 1992
INVENTOR(S) : Junichi Kobayashi It is certified that error appears in the above-identified patent and that said Letters Patent is hereby corrected as shown below:

Claim 1, Column 7, Line 18 change "ares" to --area--.

Claim 1, Column 7, Line 22 change "t" to --at--.

Claim 2, Column 8, Line 8 change "o" to --on--.

Claim 3, Column 8, Line 22 change "marker" to --markers--.

Claim 4, Column 8, Line 36 change "mean" to --means--.

Signed and Sealed this

Eighth Day of February, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,153,737
DATED : October 6, 1992
INVENTOR(S) : Junichi Kobayashi

It is certified that error appears in the above-indentified patent and that said Letters Patent is hereby corrected as shown below:

On the Title page, item [73] Assignee: change "Fuji Electronic Co., Ltd." to --Fuji Xerox Co., Ltd.--

Signed and Sealed this

Twelfth Day of April, 1994

BRUCE LEHMAN

*Attest:*

*Attesting Officer*  *Commissioner of Patents and Trademarks*